United States Patent [19]

Nakagawa et al.

[11] Patent Number: 4,525,758
[45] Date of Patent: Jun. 25, 1985

[54] CARTRIDGE

[75] Inventors: Koichiro Nakagawa, Takarazuka; Satoshi Suyama, Neyagawa; Masahiro Yanagi, Settsu; Yasutaka Nakajima, Nara, all of Japan

[73] Assignee: Matsushita Electric Industrial Co., Ltd., Osaka, Japan

[21] Appl. No.: 389,152

[22] Filed: Jun. 16, 1982

[30] Foreign Application Priority Data

| Jun. 19, 1981 | [JP] | Japan | 56-95870 |
| Jun. 19, 1981 | [JP] | Japan | 56-91146 |
| Jun. 22, 1981 | [JP] | Japan | 56-97113 |
| Jun. 22, 1981 | [JP] | Japan | 56-97114 |
| Dec. 21, 1981 | [JP] | Japan | 56-207677 |

[51] Int. Cl.$^3$ ............................................. G11B 23/02
[52] U.S. Cl. ..................... 360/133; 206/309; 206/444
[58] Field of Search .............................. 360/97–99, 360/133, 135; 206/309, 444; 346/137; 369/36, 77.1, 77.2

[56] References Cited

U.S. PATENT DOCUMENTS

| 3,416,150 | 12/1968 | Lindberg | 360/133 X |
| 3,529,301 | 9/1970 | Hiruta | 360/97 |
| 3,593,327 | 7/1971 | Shill | 360/97 |
| 4,120,012 | 10/1978 | Bowers | 360/133 |
| 4,131,199 | 12/1978 | Hatchett | 206/444 |
| 4,149,207 | 4/1979 | Townsend et al. | 360/133 |
| 4,358,801 | 11/1982 | Faber | 206/444 |

FOREIGN PATENT DOCUMENTS

| 3131901 | 5/1982 | Fed. Rep. of Germany . |
| 2191189 | 2/1974 | France . |
| 2382743 | 9/1978 | France . |
| 1525849 | 9/1978 | United Kingdom . |
| 1570775 | 7/1980 | United Kingdom . |
| 2081959 | 2/1982 | United Kingdom . |
| 2082371 | 3/1982 | United Kingdom . |

OTHER PUBLICATIONS

Electrical Design News, A. Lesea et al., "Floppy-Disc Controller Design Must Begin with the Basics", pp. 129–137, *p. 133, FIG. B*.

Primary Examiner—A. J. Heinz
Attorney, Agent, or Firm—Wenderoth, Lind & Ponack

[57] ABSTRACT

A cartridge to be inserted into a drive unit includes a casing containing a recording medium disc to be driven by the drive unit. The disc has a hub fixed at its center. Center windows are provided at opposite sides of the casing and allow the hub to be inserted therethrough. Head windows are provided also at opposite sides of the casing and allow a reading head to access information recorded on opposite sides of the disc. Shutters are provided around the center windows and normally cover the head windows. These shutters are rotatable about the center windows and uncover the head windows when the cartridge is inserted into the drive unit. An actuator for rotating the shutters is provided between the shutters and the outside of the casing. The actuator has a portion exposed to the outside of the casing so that the shutters are automatically and indirectly rotated by an external force applied to the actuator when the cartridge is inserted into the drive unit. An advantage of the arrangement of these elements is that damage to and malfunctioning of the cartridge is prevented.

21 Claims, 10 Drawing Figures

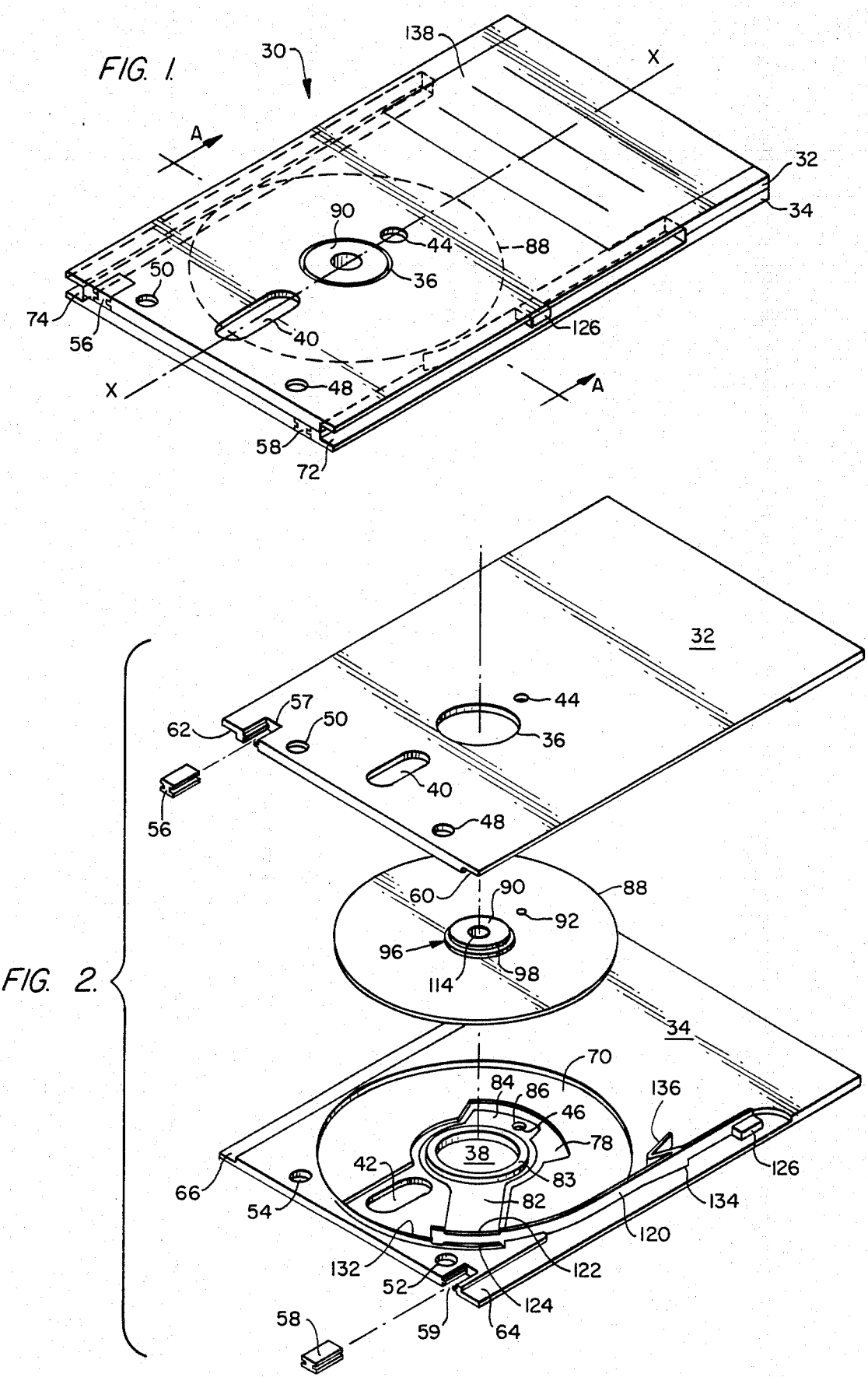

CARTRIDGE

BACKGROUND OF THE INVENTION

1. Field of the Invention

This invention relates to a cartridge which contains a recording medium disc such as a flexible magnetic sheet disc for recording information and which has windows for insertion of devices such as magnetic heads for recording/reproducing the information. Specifically, this invention offers a cartridge having a shutter mechanism for automatically but indirectly opening or closing said window.

2. Description of the Prior Art

For this kind of the disc, with generally high information density, dust, fingerprints or mechanical damage pose serious problems. This is why the disc is conventionally stored and transported in an inflexible or rigid cartridge. A floppy disc is a representative example of such a cartridge. However, a conventional cartridge such as a floppy disc cartridge or jacket has windows (head windows) for insertion of a magnetic head, through which dust and other matter enter the cartridge. The opportunity for dust and other matter to collect on the sheet should be minimized. To this end, it is desirable to mount such a shutter mechanism as to open said windows automatically but indirectly when the cartridge is loaded into a recorder/reproducer, to allow access of the recording/reproducing device to the disc, and to close the windows when the cartridge is not loaded into the recorder/reproducer. This shutter mechanism must be simple and reliable to allow for the fact that the cartridge is widely used, not only by specialists but also by the general public. Further, said cartridge is often used in large numbers for one recorder/reproducer. Therefore, the cartridge must be small, light and easy to stack and handle so as to facilitate storage and transport.

SUMMARY OF THE INVENTION

Accordingly, it is an object of the present invention to provide a cartridge housing a recording medium disc, which is easy for the general public to handle.

Another object of the present invention is to provide a cartridge housing a recording medium disc, in which the opportunity for dust and other matter to collect on the recording medium disc is minimized.

A further object of the present invention is to provide a cartridge housing a recording medium disc, which has a shutter mechanism for closing windows of the cartridge when the cartridge is not loaded into a recorder/reproducer.

These objects are achieved according to this invention by providing a cartridge comprising a casing containing therein a rotatable recording medium disc having fixed therewith at its center a disc hub comprising a first hub portion positioned at one side of said disc and a second hub portion coaxial with said first hub portion and positioned at the other side of said disc, said casing comprising a first casing element and a second casing element holding said disc therebetween.

The first casing element comprises: a first center window in which said first hub portion is inserted; a first head window in which a head for recording/reproducing informations on said disc can be inserted from outside of said first casing element; and a first shutter member movably supported by said first casing element for opening/closing said first window by its movement.

The second casing element comprises: a second center window coaxial with said first center window, in which in second center window, said second hub portion is inserted; a second head window in which a head for recording/reproducing information on said disc can be inserted from outside of said second casing element; and a second shutter member movably supported by said second casing element for opening/closing said second opening by its movement.

The cartridge further comprises a shutter actuating member movably supported by said casing and coupled to said first shutter member and said second shutter member for moving said shutter members by its movement, said shutter actuating member having an exposure portion exposed to the outside of said casing and moved by an external force given to said exposure portion of said shutter actuating member in a direction parallel to a side edge of said casing.

BRIEF DESCRIPTION OF THE DRAWINGS

These and other objects, features and advantages will be more apparent hereinafter from a consideration of the following detailed description taken in connection with the accompanying drawings in which:

FIG. 1 is an oblique view of one exemplary cartridge of this invention;

FIG. 2 is an exploded oblique view of said cartridge;

DESCRIPTION OF THE PREFERRED EMBODIMENTS

Figure 3:
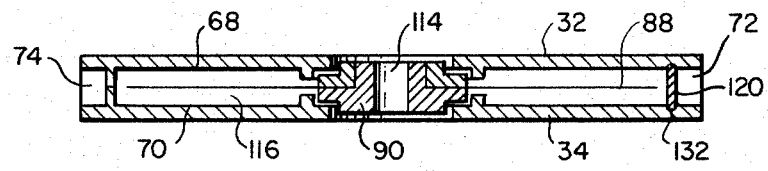
FIGS. 3 and 4 are sectional views along the line A—A in FIG. 1 and an enlarged view of the essential parts thereof, respectively.

Referring to FIGS. 1 and 2, a cartridge 30 basically consists of an upper plate 32 (first casing element) and a lower plate 34 (second casing element) which are united by suitable means such as adhesives. Both of these plates are provided with center windows 36, 38, head windows 40, 42, index windows 44, 46, positioning holes 48, 50, 52, 54, protection notches 56, 58, depressions or cutout portions 60, 62, 64, 66 on respective sides thereof and circular recesses 68 (Not shown in FIG. 2, but shown in the upper plate 32 in FIG. 3), 70. As shown in FIG. 1, the head windows, center windows and index windows are aligned on a longitudinal center line X—X of the cartridge 30. Depressions 60, 62, 64, 66 form U-shaped channels 72 and 74 at both sides of the cartridge 30. These channels 72 and 74 are open at one end thereof and closed at the other end thereof. The U-shaped channels 72, 74, positioning holes 48, 50, 52, 54 and the protection notches 56, 58 are symmetrically positioned with respect to the longitudinal center line X—X of the cartridge 30, respectively.

Describing otherwise, the first casing element 32 and said second casing element 34 have, at a side edge of said casing, a pair of opposing cutout portions 60, 62 and 64, 66, being L-shaped in cross-section taken along a plane prependicular to said side edge of said casing so as to form channels 72 and 74 U-shaped in said cross-section. Preferably, the channels 72 and 74 extend to and are thus open at one end of said side edge, while the channels 72 and 74 end before the other end of said side edge, respectively.

On the circular recesses 68 and 70, there are provided other recesses 78 (one being not shown but for the upper plate 32) in which shutter members 82, 80 (not shown in FIG. 2 but shown in FIG. 4 for the upper plate 32) are located. The shutter member 82 of the lower plate 34 is rotatably mounted on a ring portion 83 formed around the center window 38 (the shutter member 82 has a hole to which the ring portion 83 is fittedly inserted) and has an ear portion 84 on which an index opening 86 is provided. The shutter member 80 of the upper plate 32 is the same as the shutter member 82 of the lower plate 34, but is not shown in FIG. 1. In FIG. 2, the shutter member 82 occupies the "open" position, that is, the head window 42 is not closed but open. In this case, the index opening 86 meets with the index window 46 of the lower plate 34. On the contrary, when the shutter member 80 occupies the "closed" position to close the head window 42, the ear portion 84 closes the index window 46 of the cartridge 30. This equally applied to the shutter member 80 of the upper plate 32.

Figure 5:
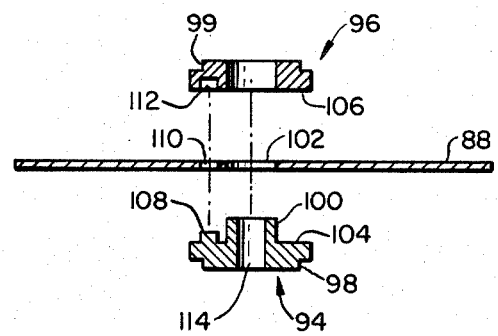
FIG. 5 is an exploded sectional view of the recording medium disc for illustration of each component.
Figure 6:
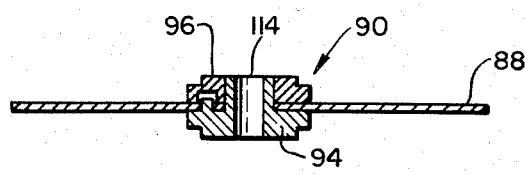
FIG. 6 is a sectional view of this disc in the state of being assembled.

As shown in FIG. 2, the disc 88 has a disc hub 90 at the center thereof and an index hole 92 which can coincide with the index windows 44, 46 of the cartridge 30. As shown in detail in FIGS. 5 and 6, the disc hub 90 is composed of a primary disc hub component 94 and a secondary disc hub component 96. The hub component 94 has a circular stepped part 98 (cylindrical hub segment) and a cylindrical part 100 (thrust portion) integrally formed therewith at its central part. The hub 96 has a circular stepped part (cylindrical hub segment) 99 being as same as the part 98. This cylindrical part 100 fits in the central hole 102 of the disc 88, serving to guide its assembling with the hub component 96 by fitting. The mutually facing surface areas 104 and 106 of the hub components 94 and 96 provide means for pinching from above and below both surfaces of the disc 88 on the perimeter of its center hole 102 when putting them together. The pin-shaped protrusion 108 integrally formed on the upper facing surface area part 104 of the hub component 94 is engagingly inserted in a round or oblong slot (position fixing hole) 110 opened in the disc 88 near its central hole 102 and the tip of the protrusion 108 is fitted in a protrusion accepting recess 112 formed in the facing surface area 106 of the hub component 96. The protrusion 108 may be formed integrally with the hub component 94 as shown in the drawings or may be provided as a part separate from the hub component 94 which is fixed between them by pressing-in and caulking. The aforementioned protrusion 108 and the recess 112 may be formed respectively on the hub component 96 and hub component 94, or in reverse relationship to the arrangement shown in the drawings.

In other words, the disc hub 90 comprises: a primary disc hub component 94 comprising a hollow cylinder part 114 and a primary ring part which has a thickness smaller than its length and is integrally inserted in a manner that a facing surface area 104 of the primary ring part is positioned on a plane lower than a top surface of the hollow cylinder part 114 so that the portion of said hollow cylinder part 114 between the top surface thereof and the plane on which the facing surface area 104 of the primary ring part is positioned forms a thrust portion 100 of the primary disc hub component 94. A secondary disc hub component 96 comprises a secondary ring part having a hollow center. Here the recording medium disc 88 has a center hole 102. The thrust portion 100 is inserted into the center hole 102 of the disc 88. So, the disc 88 is placed on the facing surface area 104 of the primary ring part. Further, the thrust portion 100, above the disc 88, is fittedly inserted into the hollow center of the secondary ring part so that the disc 88 is sandwiched between the bottom facing surface area 106 of the secondary ring part and the facing surface area 104 of said primary ring part. One half of the thus formed disc hub 90 positioned at one side of the disc 88 serves as a first cylindrical hub base, the other half of the disc hub 90 positioned at the other side of the disc 88 serves as a second cylindrical hub base. The disc hub 90 further has a first cylindrical stepped hub segment portion 98 coaxial with and smaller in diameter than and provided on the first cylindrical hub base, and also has a second cylindrical stepped hub portion 99 coaxial with and smaller in diameter than and provided on the second cylindrical hub base.

If desired, the primary ring part has provided therewith a position fixing protrusion 108 at the facing surface area 104 thereof in a length shorter than the length of the thrust portion 100. The secondary ring part has a protrusion accepting recess 112 at a bottom facing surface area 106 thereof. The recording medium disc 88 has a position fixing hole 110 in the vicinity of the center hole 102 thereof. The position fixing protrusion 108 is inserted into the position fixing hole 110 of the disc 88. Further, the position fixing protrusion 108, above the disc 88, is inserted into the protrusion accepting recess 112 of the secondary ring part.

Describing the resultant disc hub, it has a first hub portion at one side of the disc 88, and a second hub portion at the opposite side of the disc 88. The first hub portion comprises: a first cylindrical hub base fixed to the disc 88 and having a diameter larger than the center window 36; and a cylindrical stepped hub portion 99 coaxially provided on the first cylindrical hub base and inserted in the center window 36. The second hub portion comprises: a second cylindrical hub base fixed to the disc 88 and having a diameter larger than the center window 38; and a cylindrical stepped hub portion 98 coaxially provided on the second cylindrical hub base and inserted in the center window 38, so that the disc 88 is rotatably spaced from the upper plate 32 and the lower plate 34 by the first and the second cylindrical hub bases.

Such a structure is preferable to secure a rotational movement of the disc 88 and the disc hub 90 in one united body. Provided at the center of the disc hub 90, there is the hollow cylindrical part 114 which can be engaged with a drive spindle described hereinafter to rotate the disc 88.

Referring to FIGS. 2 and 3, the disc 88 is set in an inner space 116 of the cartridge 2 formed by the circular recesses 68 and 70 of the upper and the lower plates 32 and 34 in a manner that the circular stepped parts 98 and 99 (FIG. 5) of the disc hub 90 are located at the center windows 36 and 38 of the cartridge 30. The size of the center windows 36 and 38 is larger than the size of the circular stepped parts 98 and 99 and is smaller than the outer size of the disc hub 90 so that the disc hub 90 is held between the upper plate 32 and the lower plate 34. Thus, the movements of the disc hub 90 in radial and thrust directions concerning the center windows 36 and 38 are restricted within a specified range. As a result, the disc 88 keeps its position in the inner space 116 of the cartridge 30 freely from damage derived by contact of the disc 88 with the inner surface of the cartridge 30. Moreover, the shutter members 80 and 82 are positioned in the other recesses 78 (one not shown) of the cartridge 30, so that the disc 88 does not contact with the shutter members 80 and 82 and is free from such damage.

Figure 4:
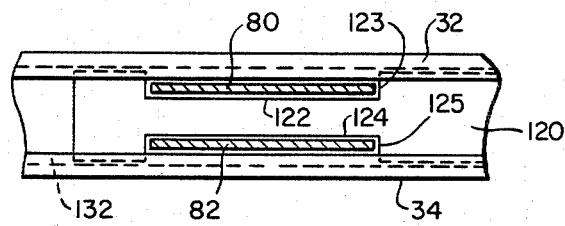

As shown in FIG. 2, a shutter actuating member is provided in the cartridge 30. In this example, the shutter actuating member consists a band-shaped flexible member 120 made of flexible resin such as vinyl chloride. The flexible member 120 has cutout portions 122 and 124 on respective side edges thereof and a protrusion 126 exposed outside at a side edge of the cartridge. The protrusion 126 can be substituted, in function, by a cutout portion. For guiding the flexible member 120, there are provided a pair of guide grooves made up of an upper plate guide groove (Not seen in FIG. 2) and a lower plate guide groove 132 (see FIG. 7 also) formed on the inner surfaces of the upper plate 32 and the lower plate 34 respectively. The pair of grooves can be construed as an element for defining a moving path of the flexible member 120. The pair of guide grooves are shown in FIG. 3 as formed on a part of the circumference of the inner space 116 of the cartridge 30 and continuously formed from the inside of the cartridge 30 to the exterior of the cartridge 30 where the pair of guide grooves are exposed in the U-shaped channels 72, and the exposed portions form straight lines substantially parallel to the side edge of the cartridge 30. The flexible member 120 is guided to reciprocally slide longitudinally with its side edges positioned in said pair of guide grooves. As shown in FIG. 4, the flexible member 120 is engaged with the shutter members 80 and 82 in such a manner that the shutter members 80 and 82 are held between the inner surfaces of the upper plate 32 and the lower plate 34 and said cutout portions 122 and 124. More specifically, the flexible member 120 has a cutout portion 122 at one side edge thereof and a cutout portion 124 at the other side edge thereof, the cutout portions 122 and 124 having sufficient depths so as to form slits 123 and 125, seen vertically to a major surface of the flexible member 120, between the flexible member 120 and respective ones of the inner recessed surfaces 78 (one not shown) of the upper plate 32 and the lower plate 34. The shutter members 80 and 82 are inserted at portions thereof in the slits 123 and 125, respectively, for the coupling between the flexible member 120 and the shutter members 80 and 82. The portions of the shutter members 80 and 82 to be inserted in the slits 123 and 125 have in cross-section substantially the same as, but slightly smaller dimensions than, the slits 123 and 125, respectively. So, the shutter members 80 and 82 are held between the flexible member 120 and the inner surfaces of respective ones of the upper plate 32 and the lower plate 34. Thus, the side edges of the flexible member 120 are slidably guided by the pair of opposing guide grooves, respectively.

Such a structure as above mentioned serves to keep the shutter members 80 and 82 in the specified positions, that is, in the recesses 78 (one not shown), even if the shutter members 80 and 82 are forced to the inner side of the cartridge 30 by some impact, through the head windows 40 and 42. The protrusion 126 of the flexible member 120 is smaller in width as compared with the width of the flexible member 120 so that the protrusion 126 can move in the U-shaped channel 72 with the slide movement of the flexible member 120 when an external force is applied to the protrusion 126.

A pair of steps 134 (one being not shown for the upper plate 32) are provided in the straight line guide grooves. When the shutter members 80, 82 are in the positions of completely closing the head windows 40, 42, the external end of the flexible member 120 is made to engage with said step 134 owing to the elasticity of an urging means 136 such as a spring provided in the cartridge 30. This prevents the sliding motion of the flexible member 120, and the shutter members 80, 82 are held in position to close the head windows 40, 42 until said engagement is released by an external force given to the protrusion 126 of the flexible member 120.

Described from another angle, the guide grooves have a pair of steps 134, respectively, seen arranged vertically in a bottom surface of each of the guide grooves at the exposed portion of the flexible member 120. The steps 134 serve as a means for restraining the flexible member 120 by engagement between the flexible member 120 and the steps 134.

Figure 7A:
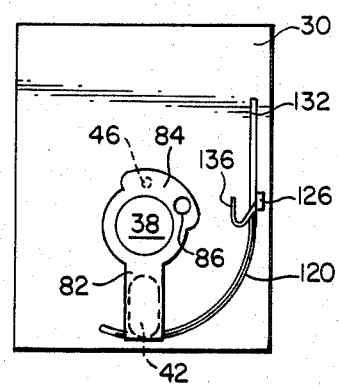
FIGS. 7a, 7b, and 7c show respective views illustrating the operation of this example.
Figure 7B:
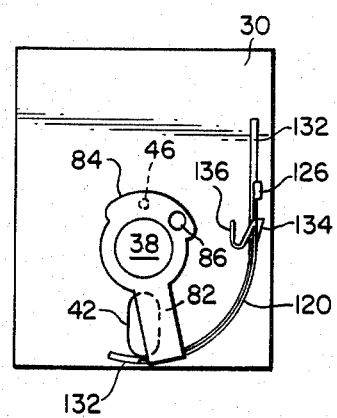

As shown in the drawings, the center windows 36 and 38 deviate from the center of the cartridge toward one of the longitudinal ends (the lower left end in the drawings) of the cartridge 30, and the head windows 40 and 42 are positioned between the center windows 36, 38 and the longitudinal ends of the cartridge 30. The result is that a relatively large surface area which does not correspond to the position of the disc 88 inside remains on the cartridge 30 at the other longitudinal end (the upper right in the drawings). A label 138 (FIG. 1) is bonded on said area, on which to make notations with a pen or the like. Labels 138 can be provided on both sides of the cartridge 30 if necessary. As shown in FIGS. 1 and 2, the upper plate 32 has the first recording protection notch 56 at a first position at an end thereof, and the lower plate 34 has the second recording protection notch 58 at an end edge thereof at a second position symmetrical to the first position with respect to the first position. The recording protection notches 56 and 58 may be of a slide type. The notches 56 and 58 are made up of blocks which are slidably inserted into cutouts 57 and 59 of the upper plate 32 and the lower plate 34, respectively. When the notch 56 for example is removed from the cutout 57 of the upper plate 32, it becomes impossible to record information on the side of the disc 88 facing the upper plate 32. Similarly, if the notch 58 is removed from the cutout 59 of the lower plate 34, it becomes impossible to record on the other side of the disc 88. It is necessary, of course, that the recorder/reproducer be equipped with a device to detect the presence of the recording protection notches 56 and 58. The cartridge positioning holes 48, 50, 52 and 54 are the holes through which positioning pins 140 and 142 of a cartridge driving apparatus 144 are inserted when the cartridge 30 is loaded into the apparatus 144 as shown in FIG. 8. The apparatus 144, shown schematically in FIG. 8, has a base plate 146, the positioning pins 140 and 142 mounted on the base plate 146, the drive spindle 148 rotatably actuated by a motor 150 installed in the base plate 146, and the device 152, for example, a magnetic head, for recording/reproducing information on the disc 88. The device 152 may be actuated to move in the head window 40 or 42 by a well-known suitable means such as a lead screw not shown. Further the apparatus 144 has a releasing member 154 rotatably mounted on a pin 156 fixed on the base plate 146. The releasing member 154 has a latching portion 158 which can be engaged with and be released from the protrusion 126 (FIG. 7) of the flexible member 120 by the rotational movement of the releasing member 154 toward and apart away from the protrusion 126, respectively, by a well-known means such as a solenoid mechanism.

The following is one application of this invention. FIG. 7(a) shows the cartridge 30 when it is not loaded in the apparatus 144. One of the ends of the flexible member 120 is engaged with the step 134, and the shutter members 80 and 82 close the head windows 40 and 42 and the index windows 44 and 46. When the cartridge 30 is inserted into the apparatus 144, the latching portion 158 of releasing member 154 automatically engages with and presses the protrusion 126 of the flexible member 120 in the opposite direction of the force exerted by the urging means 136 upon insertion of the cartridge 30. Thereby, the engagement between the end of the flexible member 120 and the step 134 is released while the releasing member 154 holds the protrusion 126 by the latching portion 158 thereof. When the cartridge 30 is further inserted into the apparatus, as shown in FIG. 7(b), the flexible member 120 makes sliding movement relatively to the cartridge 30 toward the exterior of the cartridge 30. Thus, the flexible member 120 causes the shutter members 80 and 82 to rotate automatically around the center windows 36 and 38 respectively, to open the head windows 40 and 42.

Figure 7C:
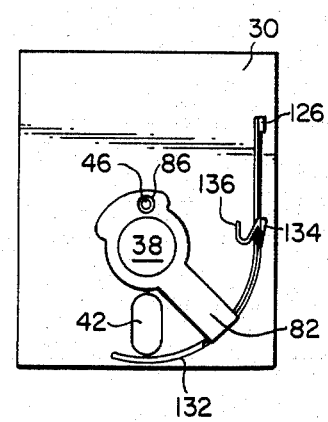
Figure 8:
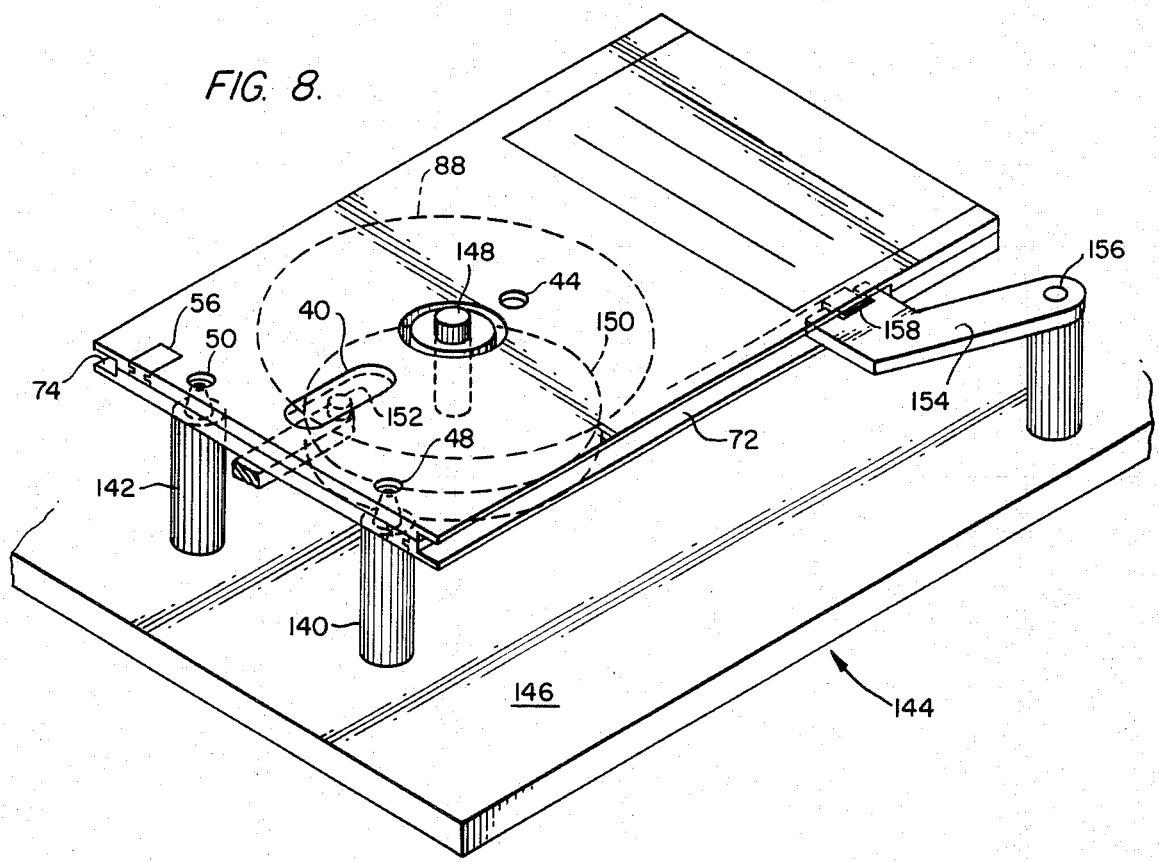
FIG. 8 is a schematic oblique view of a cartridge driving apparatus in which a cartridge of this invention is installed.

FIG. 7(c) and FIG. 8 show the state of complete insertion of the cartridge 30 into the apparatus 144. The cartridge 30 is positioned at the specified position by engagement of the positioning holes 48, 50 52 and 54 with the positioning pins 140 and 142 and the disc hub 90 is fitted to the drive spindle 148. Further, the head windows 40 and 42 and index windows 44 and 46 are fully opened, so the magnetic head 152 can be accessible to the disc 88 which may be under rotation by the drive spindle 148.

On the contrary, when the cartridge 30 is pulled out of the apparatus 144, the head windows 40 and 42 and the index windows 44 and 46 are closed by reversing the above procedure. When the closing operation is completed, the releasing member 154 releases the protrusion 126 of the flexible member 120. Thereby, the end of the flexible member 120 is automatically engaged with the step 134 by the action of the urging means 136. After that, the cartridge 30 is fully pulled out of the apparatus 144.

As described above, the cartridge 30 related to this invention is advantageous in that it can completely protect the disc 88, such as magnetic sheets, from dust and fingerprints with a simple construction and that it is very easy to handle.

Further, said protrusion 126 of the flexible member 120 is positioned in the U-shaped channel 72, thus preventing damage to or the malfunctioning of said mechanism for opening or closing the index windows 44 and 46 and the head windows 40 and 42 when said cartridge 30 is not loaded in the apparatus 144, and thus realizing a cartridge 30 with no external protrusions. In addition, erroneous loading (erroneous insertion) of said cartridge 30 into the recorder/reproducer can be prevented by simply making one end of said U-shaped channels 72 and 74 open and the other end closed.

Moreover, the direction for loading into the apparatus can be identified at a glance, in view of the rectangular shape of said cartridge 30.

Further, the head windows 40 and 42, the center windows 36 and 38 and the index windows 44 and 46 are formed on both faces of the cartridge 30 on its londitudinal center line X—X, and the cartridge positioning holes 48, 50, 52 and 54 and at least one recording protection notch 56 and 58 are provided on both faces of the cartridge 30, symmetrically with respect to its longitudinal center line. Consequently, even if the cartridge 30 is rotated 180° around the axis of its longitudinal center line, the configuration of the cartridge 30 does not change. This means that it is possible to record or reproduce information on both sides of said disc recording medium with one recording/reproducing head.

What is claimed is:

1. A cartridge to be inserted into a drive unit, said cartridge comprising:

a casing means having opposite sides and side edges for containing therein a rotatable recording medium disc to be driven by the drive unit, said casing means having one side edge open along more than 50% of its length, said recording medium disc having two opposite sides for recording information and also having a hub fixed therewith at its center;

a center window means, provided at opposite sides of the casing means, for allowing the hub to be inserted therethrough;

head window means, provided at opposite sides of the casing means for allowing a reading head to access information recorded on the two opposite sides of the recording medium disc;

shutter means, provided around the center window means, for normally covering the head window means, said shutter means being rotatable about the center window means in order to uncover the head window means when the cartridge is inserted into the drive unit;

an elongated flexible band means, provided along an outer side of the casing means and connected at one end to the shutter means, for rotating the shutter means, said flexible band means having a portion covering more than 50% of its length exposed outside at the one open side edge of the casing means so that the shutter means are automatically and indirectly rotated by an external force applied to the exposed portion of the flexible band means when the cartridge is inserted into the drive unit; and means, provided on the casing means, for defining a moving path of the flexible band means along the one open side edge of the casing means;

whereby damage to and malfunctioning of the disc is prevented, when the shutter means covers the head window means.

2. A cartridge according to claim 1, wherein said moving path defining means is a guide having a pair of opposing guide grooves provided on said casing means and wherein said flexible band means has side edges slidably guided by said pair of opposing guide grooves.

3. A cartridge according to claim 2, wherein said flexible band means has a first cutout portion at one of said edges thereof and a second cutout portion parallel to and opposite from another one of said side edges thereof, said shutter means being inserted into said first and second cutout portions in order to couple said flexible band means to said shutter means.

4. A cartridge according to claim 2, wherein said guide grooves are continuously formed from an inner side of said casing means toward a side edge of said casing means where a portion of said flexible band means is exposed to the outside of said casing means.

5. A cartridge according to claim 1, wherein said casing means has, at a side edge of said casing means, a pair of opposing cutout portions, L-shaped in cross-section, taken along a plane perpendicular to said side edge of said casing means so as to form a channel, U-shaped in said cross-section, said exposed portion of said flexible band means being moved in and along said U-shaped channel by the external force.

6. A cartridge according to claim 5, wherein said channel extends to and is thus open at one end of said side edge of said casing means, while said channel ends before another end of said side edge.

7. A cartridge according to claim 1, wherein said exposed portion of said flexible band means has one of a cutout and a protrusion to which the external force is to be applied for the movement of said flexible band means.

8. A cartridge according to claim 1, wherein said shutter means are plates supported by said casing means rotatably around the axis of said center window means.

9. A cartridge according to claim 1, wherein said casing means has a first circular recess and a second circular recess, as a space for said recording medium disc, and also have a first further recess and a second further recess provided at said first and said second circular recesses, respectively, as a space for said shutter means.

10. A cartridge according to claim 1, wherein said recording medium disc is rotatably spaced from said casing means by said hub.

11. A cartridge according to claim 1, wherein said casing means has a pair of coaxial index windows, said shutter means have a pair of index openings, which can be brought by said flexible band means to positions coaxial with both of said index windows, and said recording medium disc has an index hole which can be brought by its rotation to a position coaxial with all of said index windows and said index openings.

12. A cartridge according to claim 11, wherein said center window means, said head window means and said pair of index windows are arranged on a longitudinal center line of said casing means.

13. A cartridge according to claim 12, wherein said casing means has cartridge positioning holes at symmetrical positions with respect to said longitudinal center line for positioning said cartridge in a cartridge driving apparatus.

14. A cartridge according to claim 12, wherein said casing means has a first recording protection notch at a first position at an end edge thereof and a second recording protection notch at an end edge thereof at a second position symmetrical to said first position.

15. A cartridge according to claim 12, wherein said center window means are positioned between centers and end edges of said casing means, and said head window means are positioned between said center window means and said end edges of said casing means.

16. A cartridge according to claim 15, wherein a label for said cartridge is provided on said casing means at a position between corresponding center window means and corresponding end edges of said casing means.

17. A cartridge according to claim 1, wherein said casing means is rectangular in shape, and side edges of said casing means are longer than their end edges as an indication for the correct direction in which said cartridge is to be inserted in a cartridge driving apparatus.

18. A cartridge to be inserted into a drive unit, said cartridge comprising:

a casing means having opposites sides for containing therein a rotatable recording medium disc to be driven by the drive unit, said recording medium disc having two opposite sides for recording information and also having a hub fixed therewith at its center;

a center window means, provided at opposite sides of the casing means, for allowing the hub to be inserted therethrough;

head window means, provided at opposite sides of the casing means for allowing a reading head to access information recorded on the two opposite sides of the recording medium disc;

shutter means, provided around the center window means, for normally covering the head window means, said shutter means being rotatable about the center window means in order to uncover the head window means when the cartridge is inserted into the drive unit;

an elongated flexible band means, provided along an outer side of the casing means and connected at one end to the shutter means, for rotating the shutter means, said flexible band means having a portion exposed outside at a side edge of the casing means so that the shutter means are automatically and indirectly rotated by an external force applied to an exposed portion of the flexible band means when the cartridge is inserted into the drive unit;

means provided on the casing means, for defining a moving path of the flexible band means;

wherein said moving path defining means is a guide having a pair of opposing guide grooves provided on said casing means, and wherein said flexible band means has side edges slidably guided by said pair of opposing guide grooves;

wherein said guide grooves have a pair of triangular steps having their altitudes arranged in a direction parallel to a lengthwise axis of a bottom surface of each of said guide grooves at said exposed portion of said flexible band means, said steps serving as a means for restraining said flexible band means by engagement between said flexible band means and said steps, said engagement being releasable by an external force applied to said exposed portion of said flexible band means;

whereby damage to and malfunctioning of the disc is prevented when the shutter means covers the head window means.

19. A cartridge according to claim 18, further comprising:

means, provided in said casing means in the vicinity of said steps, for urging said flexible band means toward said steps for the restraining engagement between said flexible band means and said steps.

20. A cartridge to be inserted into a drive unit, said cartridge comprising:

a casing means having opposite sides for containing therein a rotatable recording medium disc to be driven by the drive unit, said recording medium disc having two opposite sides for recording information and also having a hub fixed therewith at its center;

a center window means, provided at opposite sides of the casing means, for allowing the hub to be inserted therethrough;

head window means, provided at opposite sides of the casing means for allowing a reading head to access information recorded on the two opposite sides of the recording medium disc;

shutter means, provided around the center window means, for normally covering the head window means, said shutter means being rotatable about the center window means in order to uncover the head window means when the cartridge is inserted into the drive unit;

an elongated flexible band means, provided along an outer side of the casing means and connected at one end to the shutter means, for rotating the shutter means, said flexible band means having a portion exposed outside at a side edge of the casing means so that the shutter means are automatically and indirectly rotated by an external force applied to an exposed portion of the flexible band means when the cartridge is inserted into the drive unit;

means, provided on the casing means, for defining a moving path of the flexible band means;

wherein said moving path defining means is a guide having a pair of opposing guide grooves provided on said casing means, and wherein said flexible band means has side edges slidably guided by said pair of opposing guide grooves;

wherein said flexible band means has a first cutout portion at one of said side edges thereof and a second cutout portion parallel to and opposite from another one of said side edges thereof, said shutter means being inserted into said first and second cutout portions in order to couple said flexible band means to said shutter means;

wherein said shutter means to be inserted in said first and second cutout portions have in cross-section substantially the same as, but slightly smaller dimensions than, said first and second cutout portions;

whereby damage to and malfunctioning of the disc is prevented when the shutter means covers the head window means.

21. A cartridge to be inserted into a drive unit, said cartridge comprising:

a casing means having opposite sides for containing therein a rotatable recording medium disc to be driven by the drive unit, said recording medium disc having two opposite sides for recording information and also having a hub fixed therewith at its center;

a center window means, provided at opposite sides of the casing means, for allowing the hub to be inserted therethrough;

head window means, provided at opposite sides of the casing means for allowing a reading head to access information recorded on the two opposite sides of the recording medium disc;

shutter means, provided around the center window means, for normally covering the head window means, said shutter means being rotatable about the center window means in order to uncover the head window means when the cartridge is inserted into the drive unit;

a flexible band means, provided along an outer side of the casing means and connected at one end to the shutter means, for rotating the shutter means, said flexible band means having a portion exposed outside at a side edge of the casing means so that the shutter means are automatically and indirectly rotated by an external force applied to an exposed portion of the flexible band means when the cartridge is inserted into the drive unit;

means, provided on the casing means, for defining a moving path of the flexible band means;

wherein said shutter means are plates supported by said casing means rotatably around the axis of said center window means;

wherein said casing means has a first ring and a second ring coaxially provided with said center window means, and said shutter means have a first hole and a second hole, to which said first ring and said second ring are fittedly inserted so that said shutter means can rotate around said first ring and said second ring;

whereby damage to and malfunctioning of the disc is prevented when the shutter means covers the head window means.

* * * * *